July 21, 1964  M. AUPHAN  3,141,974

INFRARED RADIATION DETECTION DEVICE

Filed Sept. 20, 1960

INVENTOR
MICHEL AUPHAN

BY
*Frank R. Trifari*
AGENT

United States Patent Office 3,141,974
Patented July 21, 1964

3,141,974
INFRARED RADIATION DETECTION DEVICE
Michel Auphan, Neuilly-sur-Seine, France, assignor to North American Philips Company, Inc., New York, N.Y., a corporation of Delaware
Filed Sept. 20, 1960, Ser. No. 57,346
Claims priority, application France Sept. 30, 1959
11 Claims. (Cl. 250—83.3)

This invention relates to infrared radiation detection device, in particular to an infrared radiation image converter for obtaining a visible image from an infrared image.

The invention has for its object to provide an infrared detection device which satisfies the various requirements of the art better than known radiation detection systems.

According to the invention, an infrared radiation detection device comprises in combination a thin element of ferromagnetic material exhibiting magneto-optical Kerr-effect, said element being adapted to intercept the radiation to be detected, means for magnetizing said element while said element is held at a temperature slightly below the Curie-point of the material of said element, means for illuminating said element with polarized visible light and means for observing changes in the direction of the polarization of the visible light reflected or passed by said element.

In accordance with a further elaboration of the invention, an infrared radiation detection device in the form of an image-converter comprises, in combination, a mosaic of ferromagnetic particles exhibiting magneto-optical Kerr-effect mounted on a suitable carrier adapted to have an infrared image projected thereon, means for subjecting said mosaic to a magnetic field substantially perpendicular to the plane of said mosaic, means for holding said ferromagnetic particles at a temperature slightly below the Curie-point of the material of said particles, means for uniformly illuminating said mosaic with polarized visible light in a more or less normal direction and observing means comprising a polarizing analyzer for observing the visible light passed or reflected by said mosaic.

According to a further aspect of the invention the ferromagnetic material exhibiting magneto-optical Kerr-effect utilized in the device according to the invention is preferably gadolinium.

In order that the invention may be clearly understood and readily carried into effect, it will now be described more fully with reference to the accompanying drawing, in which.

The physical phenomenon utilized in a detection device according to the invention is the very rapid disappearance of the ferromagnetic properties of an element of a ferromagnetic material, when under the action of heat produced by the exposure to the infrared radiation to be detected, the temperature of the element rises to a region lying near the Curie-point of the material concerned.

The property of which the variation is utilized to detect the heating of the element by infrared detection is the rotation of the polarization plane of polarized visible light reflected or passed by the ferromagnetic element due to and dependent on the magnetic polarization of the material of said element (magneto-optical Kerr-effect).

When the element is held at a temperature which is slightly lower than the Curie temperature of the ferromagnetic material of which this element is made, optical means are utilized to detect in a conventional manner the variations of the magnetic polarization by observing the changes in polarization of polarized visible light illuminating said element.

Figure 1:
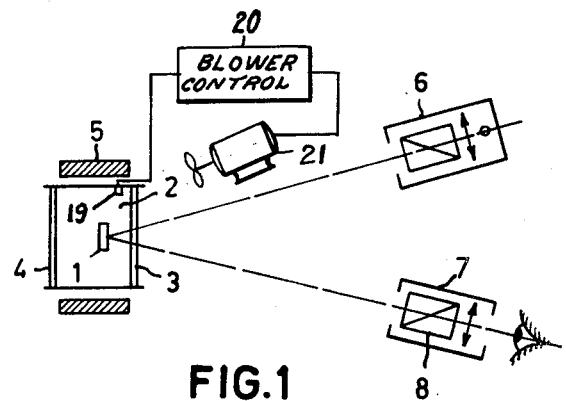
FIG. 1 shows diagrammatically the principle of a detection device according to the invention.

FIG. 1 shows diagrammatically the means which may be used to detect the variations of the magnetic polarization of an element 1 of ferromagnetic material. This element, of which at least one surface is polished, is arranged in a space 2, of which the temperature is chosen so that the element, if not struck by infrared radiation, has a temperature which is slightly lower than the Curie temperature of the ferromagnetic material used. A suitable ferromagnetic material for use in accordance with the invention is gadolinium, a material whose Curie-point is approximately 16° C., which thereby greatly facilitates the control of the temperature of the space 2. Apparatus for controlling the temperature of an enclosed volume is well-known, and any convenient means for maintaining the temperature of the space 2 slightly below the Curie-point of the element 1 may be used. Under normal room temperature conditions, the space 2 may be maintained at a temperature of 15–16° C., as required if element 1 is composed of gadolinium, by merely providing some form of controlled cooling apparatus. For the sake of simplicity, the temperature controlling apparatus is shown to comprise a thermostat 19 conveniently mounted within the space 2, the output of which is used to operate a blower control unit 20, which in turn operates an air blower 21. It is also obvious that the temperature of the space 2 may be controlled by circulating a liquid through the walls of the housing enclosing space 2, the temperature of the liquid being automatically controlled by any well-known temperature control means, for example, a thermostat or the like.

The space 2 has a window 3 which is pervious to visible light and a window 4 which is pervious to the radiation to be detected. The polished surface of the element is arranged approximately parallel to the window 3. The toroidal magnet 5 of magnetizing coil shown in a sectional view, permits of magnetizing the element 1 at right angles to the polished surface. The polished surface of the element is exposed substantially at right angles to polarized visible light by means of the source 6 of polarized light. The said surface is observed by means of the device 7 comprising a polarizing analyzer 8.

In absence of the infrared radiation, the analyzer 8 is rotated to such position that the visible light reflected by the element 1 is suppressed. When the infrared radiation reaches, via the window 4, the element 1, the latter is heated. The temperature thereof shifts to a region lying near the Curie-point of the material concerned so that gradually the ferromagnetic properties of the element disappear. In order to obtain the suppression in the analyzer 8 of the light reflected by the element 1, it is required to turn the analyzer 8. It will appear that the angle through which the analyzer 8 is to be turned to obtain again the extinction of the light constitutes a reference magnitude for the intensity of the infrared radiation projected onto the element 1.

An image converter according to the invention comprising a plurality of detection elements of ferromagnetic material will now be described, said converter permitting the reproduction of an infrared image as a visible image.

Figure 2:
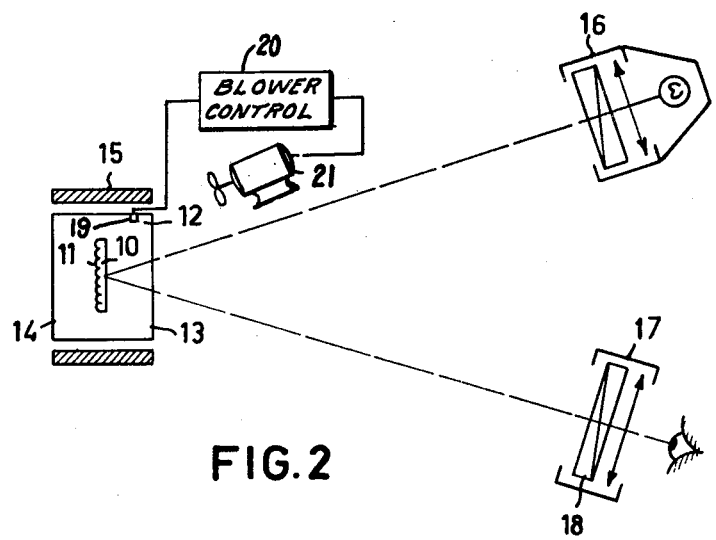
FIG. 2 shows schematically an image converter according to the invention.

Referring to FIG. 2, reference numeral 10 designates a strip which is transparent to visible light and which has a low thermal conductivity, for example, of collodium, on which is arranged a mosaic 11 of ferromagnetic particles of a material exhibiting magneto-optical Kerr-effect, for instance, gadolinium. The assembly of the mosaic and of its support is arranged in a space 12, of which the temperature is held at a value such that in the absence of infrared radiation, the temperature of the mosaic 11 is constant and lies slightly below the Curie temperature of the material of the mosaic particles. Temperature control apparatus comprising thermostat 19, blower control unit 20 and air blower 21, similar to that described for FIG. 1, may be conveniently used for this purpose.

The toroidal magnet or magnetizing coil 15 is capable of uniformly magnetizing the mosaic 11 at right angles to its surface.

By means of a source 16 of polarized visible light, the rear surface of the mosaic 11 is uniformly illuminated through the window 13, which is transparent to visible light. The surface of the mosaic is observed by means of the device 17 comprising a polarizing analyzer 18. A window 14, which is transparent to infrared radiation, permits of projecting the image to be converted onto the particles of the mosaic. It is obvious that the control of the temperature of the space 12 must also take into account any heating effect on the mosaic 11 produced by the visible light from source 16 impinging on the mosaic.

By turning the analyzer 18, the mosaic remains completely dark in the absence of infrared radiation, viewed via the device 17. When an image is projected onto the mosaic, the various particles are locally heated, which results in a reduction of the ferromagnetic polarization of the particles concerned. This reduction may be so great that the effect of the magnetic polarization variations vanishes completely and the material of the mosaic becomes paramagnetic.

The rotation of the polarization plane of the visible light rays, reflected by the mosaic elements, with respect to the plane of polarization of the light issuing from the source diminishes, when the infrared radiation received by these particles increases. Via the analyzer 18, an image then appears, in which the bright parts correspond to the regions of the mosaic subjected to the infrared radiation of maximum intensity.

The discontinuous structure of the mosaic 11 is advantageous to reduce the thermal surface conductivity, but this structure is not required and a thin, uninterrupted layer of, for example, gadolinium, is capable of providing a thermal surface conductivity which is sufficiently low to obtain a detailed image.

What is claimed is:

1. A thermal detection device for measuring the intensity of radiation, comprising an element of ferromagnetic material exhibiting the magneto-optical Kerr effect, said element being positioned to intercept the radiation to be detected, means for magnetizing said element, means for maintaining the temperature of said element at a point slightly below the Curie-point of the material comprising said element, means for illuminating said element with a beam of polarized light, and means for detecting changes in the direction of the polarization of the light impinging on said element as the amount of radiation intercepted by said element varies.

2. An infrared radiation detection device comprising an element of ferromagnetic material exhibiting the magneto-optical Kerr effect, said element being positioned to intercept the infrared radiation to be detected, means for magnetizing said element, means for maintaining the temperature of said element at a point slightly below the Curie-point of the material of said element, means for illuminating said element with a beam of polarized visible light, and means for detecting changes in the direction of polarization of the visible light illuminating said element.

3. An infrared radiation detector comprising an element of ferromagnetic material having one light reflecting surface, said element being positioned to receive the infrared energy to be measured, means for magnetizing said element at substantially right angles to the light reflecting surface, means for maintaining the temperature of said element at a point slightly below the Curie-point of the material comprising said element, means for illuminating the reflecting surface of said element with a beam of polarized light, and means for detecting changes in the direction of polarization of the light reflected by said element.

4. An infrared radiation detector comprising a relatively thin element of ferromagnetic material having one polished surface, said element being positioned to receive the infrared energy to be measured, means for magnetizing said element at substantially right angles to the polished surface, means for maintaining the temperature of said element at a point slightly below its Curie-point in the absence of infrared energy received, means for illuminating the polished surface with a beam of polarized visible light, said beam impinging on said polished surface substantially at right angles, analyzing means positioned to receive the beam reflected from said polished surface, said analyzing means being adapted to detect the change in the direction of polarization of said light beam from a reference point.

5. An infrared image converter comprising a mosaic of ferromagnetic particles exhibiting the magneto-optical Kerr effect and positioned to have an infrared image projected thereon, means for subjecting said mosaic to a magnetic field substantially perpendicular to the surface of said mosaic, means for maintaining said ferromagnetic particles at a temperature slightly below the Curie-point of the material comprising said particles, means for uniformly illuminating said mosaic with polarized visible light, and analyzing means for observing the visible light illuminating said mosaic.

6. An infrared image converter comprising a planar mosaic of ferromagnetic particles, each of said particles having one light reflecting surface, means for projecting an infared image onto the mosaic, means for producing a magnetic field substantially perpendicular to the plane of said mosaic, said mosaic being disposed within said field, means for maintaining said ferromagnetic particles at a temperature slightly below the Curie-point of the material comprising said particles, means for uniformly illuminating the light reflecting surfaces of said mosaic with polarized light, and analyzing means disposed to receive the light reflected from said mosaic, the output of said analyzing means providing a visual indication of said infrared image.

7. An infrared image converter comprising a transparent plate on which is arranged a mosaic of ferromagnetic particles exhibiting the magneto-optical Kerr effect, means for uniformly magnetizing said mosaic substantially at right angles to its surface, means for projecting an infrared image onto the mosaic whereby the individual particles of said mosaic are heated, means for maintaining said ferromagnetic particles at a temperature slightly below their Curie-point in the absence of infrared energy, means for directing a beam of polarized light through said transparent plate onto said mosaic, and means for detecting changes in the angle of polarization of the light reflected from said mosaic.

8. Apparatus as described in claim 7, in which the transparent plate is composed of a material having low thermal conductivity.

9. An infrared image converter comprising a relatively thin plate of ferromagnetic material exhibiting the magneto-optical Kerr effect and having a low thermal surface conductivity, means for magnetizing said plate substantially at right angles to its broad surface, means for projecting an infrared image onto the plate surface, means for maintaining the temperature of said plate at a point slightly below its Curie-point, means for uniformly illuminating said plate with polarized light, and means for detecting changes in the angle of polarization of the light impinging on said plate.

10. Apparatus as described in claim 9, in which the plate comprises an uninterrupted layer of gadolinium.

11. An infrared radiation detection device comprising an element of ferromagnetic material having a light reflecting surface, means for producing a magnetic field at right angles to said reflecting surface, said element being positioned within said magnetic field and arranged to intercept and to be heated by the infrared radiation to be detected, means for maintaining the temperature of said element at a point below the Curie-point of said ferromagnetic material, means for illuminating the reflecting surface of said element with a beam of plane polarized light impinging on said surface substantially at right angles thereto, and means for detecting changes in the angle of rotation of the plane of polarization of said light beam as the amount of radiation intercepted by said element changes.

References Cited in the file of this patent
UNITED STATES PATENTS

| | | |
|---|---|---|
| 1,642,011 | Chubb | Sept. 13, 1927 |
| 2,824,235 | Hahn et al. | Feb. 18, 1958 |
| 2,913,665 | Bomke | Nov. 17, 1959 |
| 2,984,825 | Fuller et al. | May 16, 1961 |
| 3,077,538 | Franzen | Feb. 12, 1963 |